(12) United States Patent
Suggs

(10) Patent No.: US 8,970,498 B2
(45) Date of Patent: Mar. 3, 2015

(54) TOUCH-ENABLED INPUT DEVICE

(75) Inventor: Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 13/097,258

(22) Filed: Apr. 29, 2011

(65) Prior Publication Data
US 2012/0274567 A1 Nov. 1, 2012

(51) Int. Cl.
G06F 3/02 (2006.01)
G06F 1/16 (2006.01)
G06F 3/01 (2006.01)
G06F 3/044 (2006.01)
G06F 3/0488 (2013.01)

(52) U.S. Cl.
CPC ............ *G06F 3/0202* (2013.01); *G06F 1/1673* (2013.01); *G06F 3/016* (2013.01); *G06F 3/044* (2013.01); *G06F 3/04883* (2013.01); *G06F 3/04886* (2013.01)
USPC ........... 345/168; 345/173; 341/21; 178/18.01

(58) Field of Classification Search
CPC .... G06F 3/0202; G06F 3/0219; G06F 3/0213
USPC ........... 345/173–179, 168; 178/18.01–18.04; 341/21–23
See application file for complete search history.

(56) References Cited

U.S. PATENT DOCUMENTS

| | | | |
|---|---|---|---|
| 6,118,436 A * | 9/2000 | Kushita | 345/173 |
| 8,115,737 B2 * | 2/2012 | Oba et al. | 345/168 |
| 2008/0055252 A1 * | 3/2008 | Miyake et al. | 345/168 |
| 2009/0085878 A1 | 4/2009 | Heubel et al. | |
| 2009/0315830 A1 | 12/2009 | Westerman | |
| 2010/0026655 A1 | 2/2010 | Harley | |
| 2010/0149099 A1 * | 6/2010 | Elias | 345/168 |
| 2010/0149106 A1 | 6/2010 | Gray | |

FOREIGN PATENT DOCUMENTS

WO  WO-2009049331 A2  4/2009

OTHER PUBLICATIONS

Chang; Wen-Yang, et al.; "Flexible Electronics Sensors for Tactile Multi-touching"; Feb. 24, 2009; pp. 1188-1203.

* cited by examiner

*Primary Examiner* — Kimnhung Nguyen
(74) *Attorney, Agent, or Firm* — Hewlett-Packard Patent Department

(57) ABSTRACT

Embodiments of the present invention disclose a touch-enabled input device for a computing system. According to one embodiment, the touch enabled device includes a housing having an input surface and a plurality of identifiable key areas formed along the input surface. The input surface of the device is configured to detect individual presses of each key area in addition to touch-based input from a user.

10 Claims, 5 Drawing Sheets

TOUCH-ENABLED INPUT DEVICE

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on an associated display unit. As computer systems have grown in popularity, however, alternate input and interaction systems have been developed.

For example, touch-based, or touchscreen computer systems allow a user to physically touch the display unit and have that touch registered as an input at the particular touch location, thereby enabling a user to interact physically with objects shown on the display of the computer system. Multi-touch detection systems, in which multiple points of contact are detected, are being increasingly utilized for facilitating user interaction with touch-enabled display devices. Despite the advances in touch-based technology, however, keyboards and mice are often still the preferred input devices for speedy and large data entry activities

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
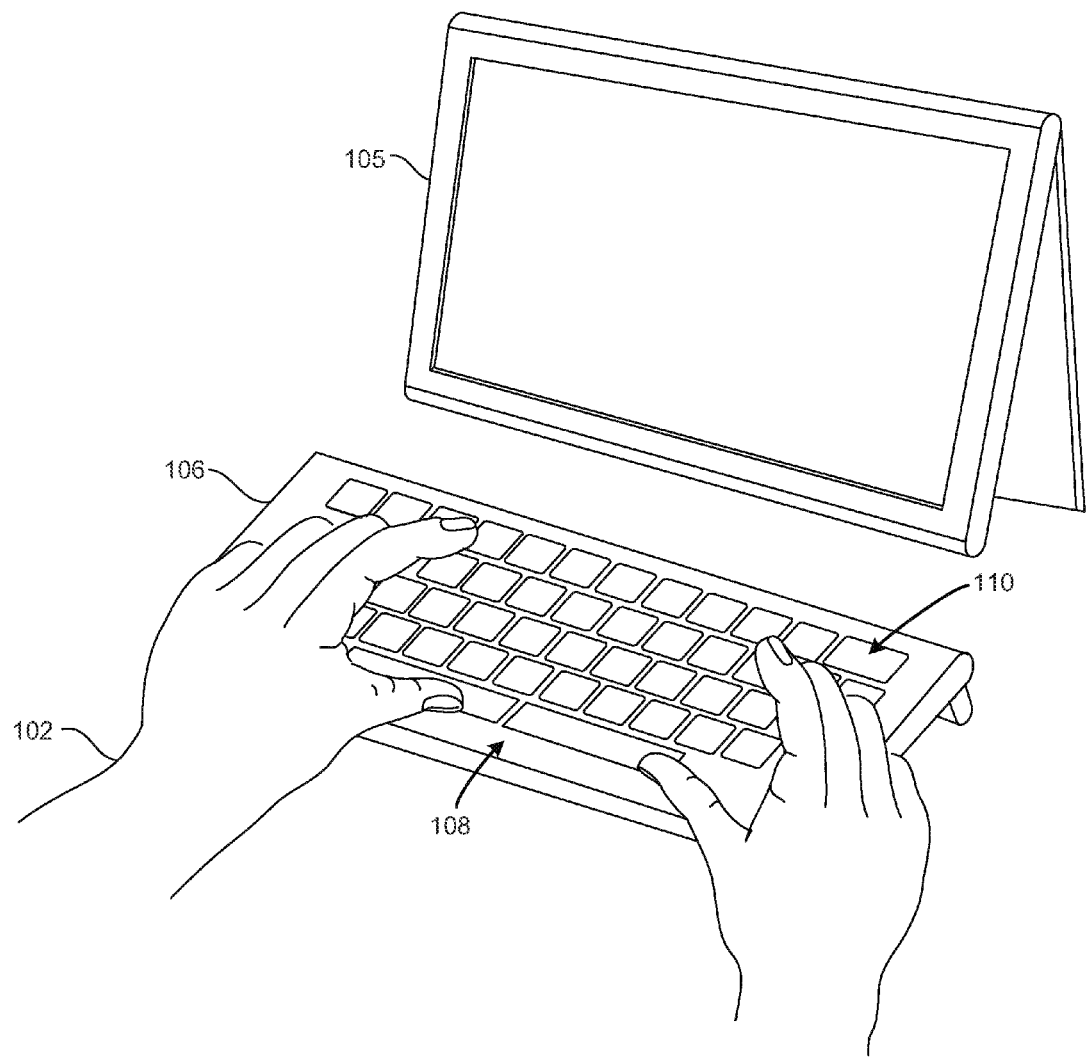
FIG. 1 is a three-dimensional illustration of an operating environment utilizing the touch-enabled input device according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Modern operating systems anticipate the availability of both keyboard and mouse as input mechanisms yet efficient and robust combination of these well-known technologies has proven challenging. For example, the TrackPoint® keyboard by International Business Machines Corporation (I.B.M) utilizes a pointing stick, or a small moveable peg positioned in the center of the keyboard for providing a fast mouse input means within the typing area of the keyboard. However, this particular keyboard lacks multi-touch capabilities and also requires a separate element for the pointing stick. Other keyboard solutions include optical cameras for providing alternative input means, but these keyboards also lack multi-touch capability and the placement of the image sensing devices ultimately contributes to detection inaccuracies and inefficiencies during operation.

Examples of the present invention provide a touch-enabled input device for a computing system. According to one example, the input device includes an input surface having a plurality of identifiable key areas formed thereon. The input surface is touch-enabled and capable of distinguishing character or keyboard entry from touchscreen or touch-based input and gestures received from an operating user.

Referring now in more detail to the drawings in which like numerals identify corresponding parts throughout the views, FIG. 1 is a three-dimensional illustration of an operating environment utilizing the touch-enabled input device according to an example of the present invention. As shown here, the operating environment includes a user 102 operating a computing system 100 including a display unit 105 and an input device 104. The display unit 105 is electronically coupled to the input device 104 via a wireless or wired connection. In one example, the input device 104 includes an outer housing 106 having a touch-enabled surface 108 facing the operating user 102. Moreover, the surface 108 includes a plurality of digitized keys or keyboard 110 formed thereon. According to one example, each key of the digitized keyboard 110 are identifiable via a border region and depression mechanism as will be described in more detail with reference to FIGS. 3A and 3B. Configuration of the input device serves to ensure that no major hand movement is required by the operating user 102 for standard keyboard input, mouse input, or multi-touch gesture input. For example, a user may execute touchscreen-related or touch-based input including pinch, zoom, and rotate operations in addition to normal mouse-related operations immediately after or before text entry without repositioning their hands. In short, examples of the present invention enable a single device that interprets the input intent of a user so as to provide multiple operating modalities.

Figure 2:
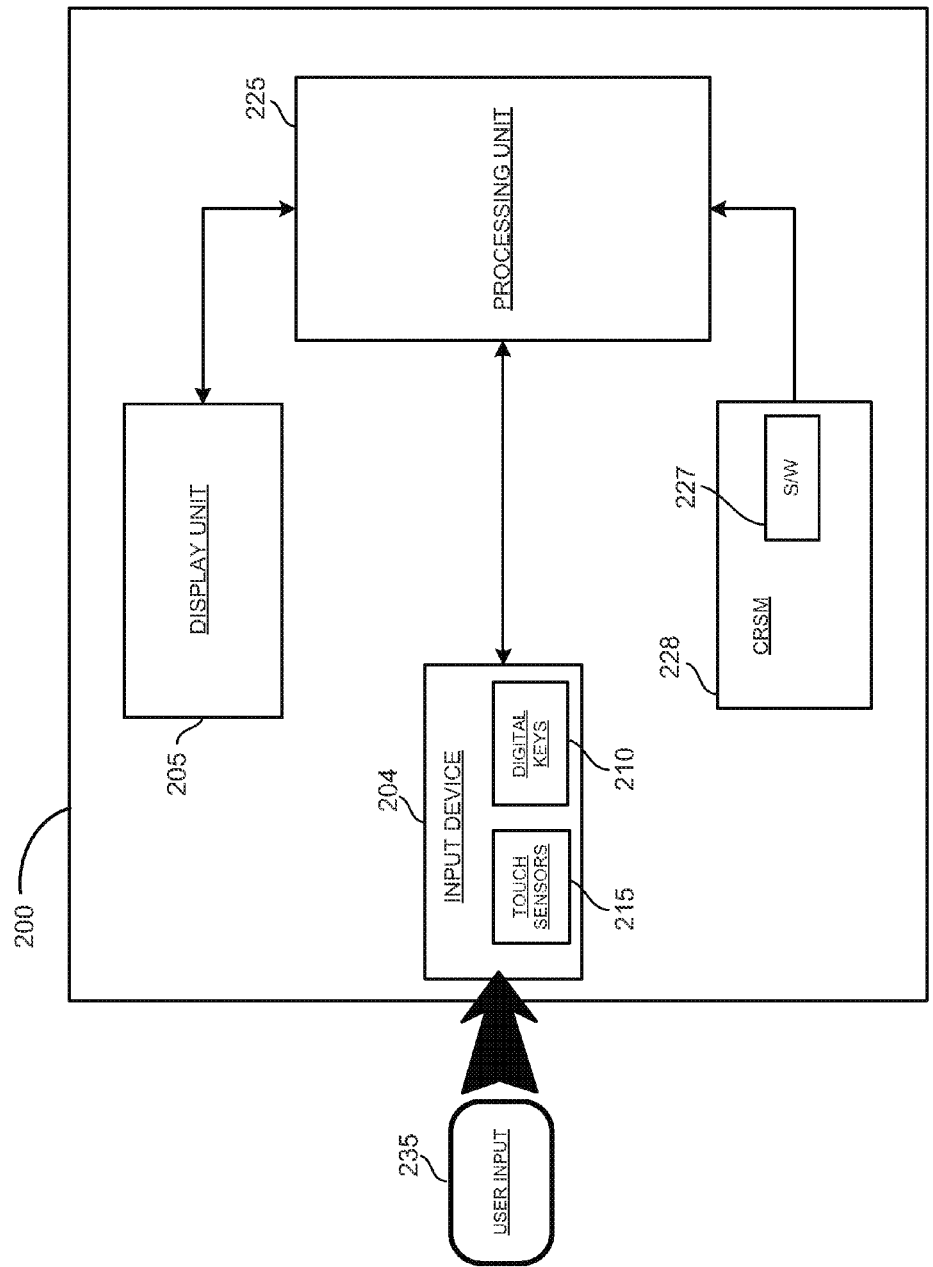
FIG. 2 is a simplified system diagram of a system implementing the touch-enabled input device according to an example of the present invention.

FIG. 2 is a simplified system diagram of a system implementing the touch-enabled input device according to an example of the present invention. As shown in this example, the system 200 includes a processor 225 coupled to a display unit 207, an input device 204, and a computer-readable storage medium 228. In one embodiment, processor 225 represents a central processing unit (CPU), microcontroller, microprocessor, or logic configured to execute programming instructions associated with the touch-enabled device and computing system 200. Input device 204 represents a housing and touch-enabled surface having a plurality of touch sensors 215 and digitized input keys 210 formed thereon. Display unit 207 represents an electronic visual display configured to display images to an operating user such as a liquid crystal display (LCD) panel, CRT monitor, or touch-enabled display device. Storage medium 228 represents volatile storage (e.g. random access memory), non-volatile store (e.g. hard disk drive, read-only memory, compact disc read only memory, flash storage, etc.), or combinations thereof. Furthermore, storage medium 228 includes software 227 that is executable by processor 225 and, that when executed, causes the processor 220 to perform some or all of the functionality described herein.

Figure 3A:
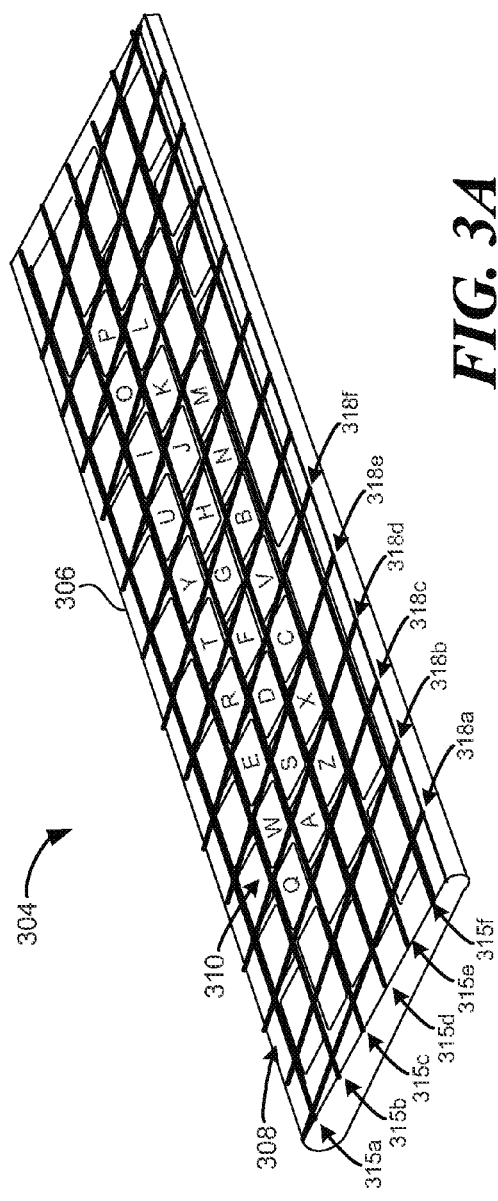
FIGS. 3A and 3B are three-dimensional and side views respectively of the touch-enabled input device according to an example of the present invention.
Figure 3B:
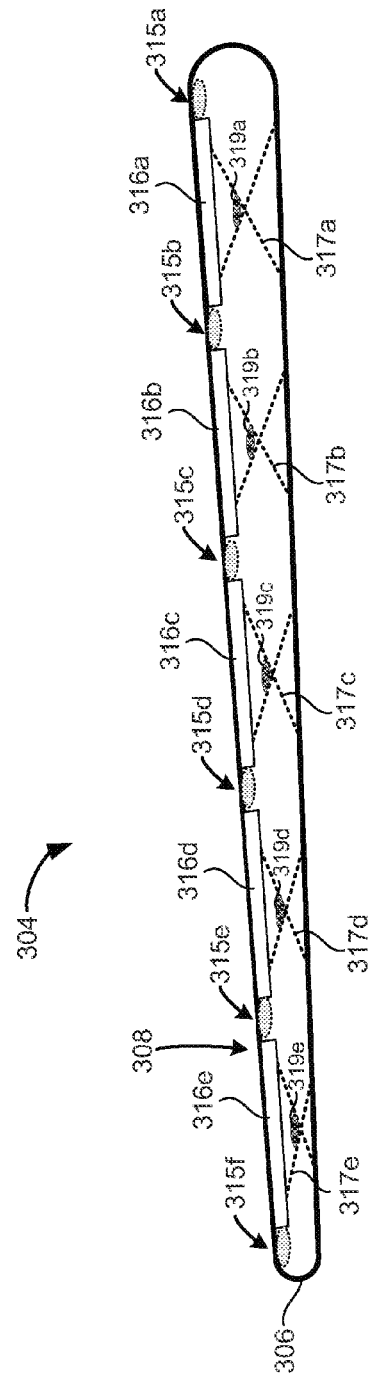

FIGS. 3A and 3B are three-dimensional and side views respectively of the touch-enabled input device according to an example of the present invention. As shown in FIG. 3A, the input device 304 includes a plurality of touch sensors or wires 315a-315f and 318a-318f formed adjacent to the input surface 308 of the touch-enabled input device 304. In one example, touch wires 315a-315f and 318a-318f overlap and combine to represent sensors of conductive layers associated with a touch capacitive surface. For example, a small voltage may be applied to the layer and wires 315a-315f and 318a-318f so as to create a uniform electrostatic grid on the input surface 308 of the device 304. Upon receiving input from a conducing agent (e.g., user's finger), the capacitance is dynamically changed and the processor may then measure the change in capacitance to determine the location of the received input. However, examples of the present invention are not limited thereto as any touch-surface detection means may be employed including resistive, surface acoustic wave, infrared or similar means as will be appreciated by one skilled in the art. Alternatively, the wires 315a-315f and 318a-318f of the conductive layer may be formed in adjacent corners of the touch surface and in such case touch input will draw current from each corner. Still further, the wires 315a-315f and 318a-318f of the conductive layer may positioned above the identifiable key area or around a border region of the identifiable key area as will be explained in more detail with reference to FIG. 3B.

As shown in the example of FIG. 3B, the input device 304 includes a housing 306 for accommodating a plurality of identifiable key areas 316a-316f and touch sensors 315a-315f formed along the touch surface 308. As shown here, the input surface 308 including the key areas 316a-316f should be a uniform flat surface such that a user may slide their finger across the input device 304 without depressing any individual key area. Moreover, each key area 316a-316f includes a depression mechanism 317a-317f configured to keep the associated key area in a level and coplanar position (i.e., same vertical height) with respect to the other key areas and touch surface 308. For example, the depression mechanism 317a-317f may be a scissor lift mechanism (as depicted), elastomer, spring coil or similar mechanism that provides resistance for each key area while allowing the key area to return to its original raised and fixed position following depression from a user. Furthermore, an electrical contact 319a-319e is associated with each key area 315a-315e respectively for signaling to the processing unit when a particular key area has been sufficiently depressed (i.e., underside of key 315a-315e directly abuts electrical contact 319a-319f) thus indicating a user's desire for key/character input (i.e., exceeds pressure threshold). The conductive layers and wires 315a-315f and 318a-318f thereof may be positioned coplanar with the border regions of the identifiable key areas 316a-316f so that a user's touch on the input surface 308 is immediately recognized. Additionally, the wires 315a-315f and 318a-318f may be formed to substantially correspond with the border region of the each digitized key area 316a-316f (as shown in FIG. 3A). According to one example, each digitized key area is mapped to a particular input key or character. Still further, a particular key or key combination may be designated as a mode activation key or combination for switching between operating modes (i.e., text input mode and touch input mode). According to one example, depression of two separated spacebar keys may cause the system to operate in a mouse or gesture operating mode, while depression of a single spacebar key would accomplish the customary space text function.

Figure 4A:
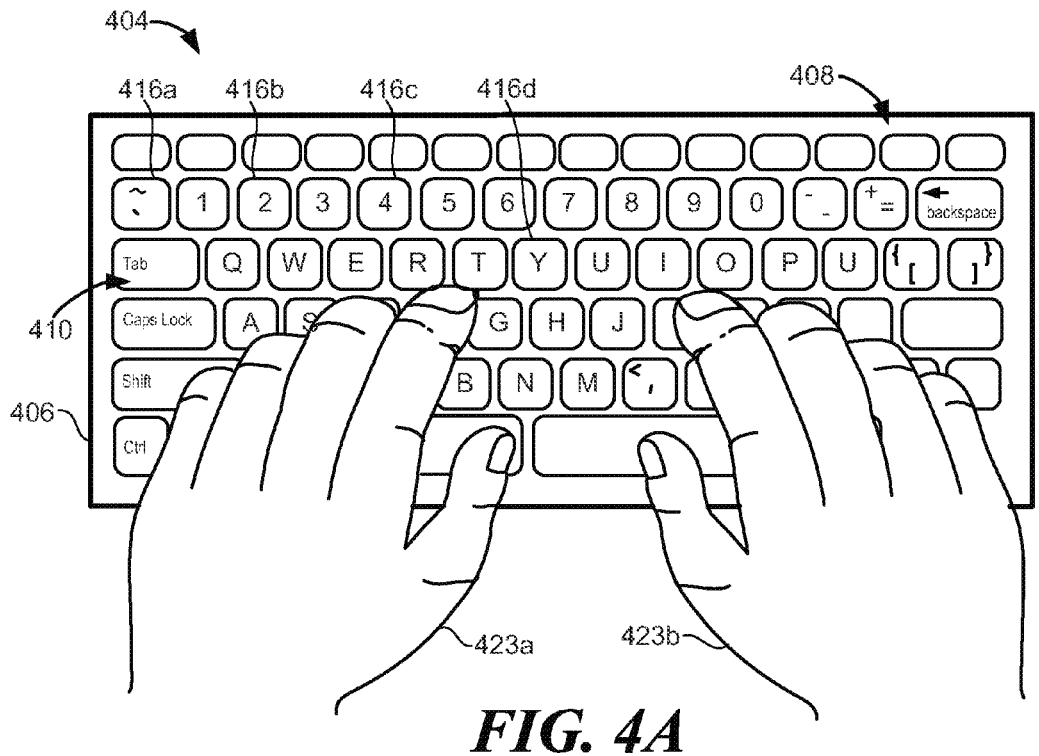
FIGS. 4A-4B are top-down views of the touch-enabled input device according to an example of the present invention.
Figure 4B:
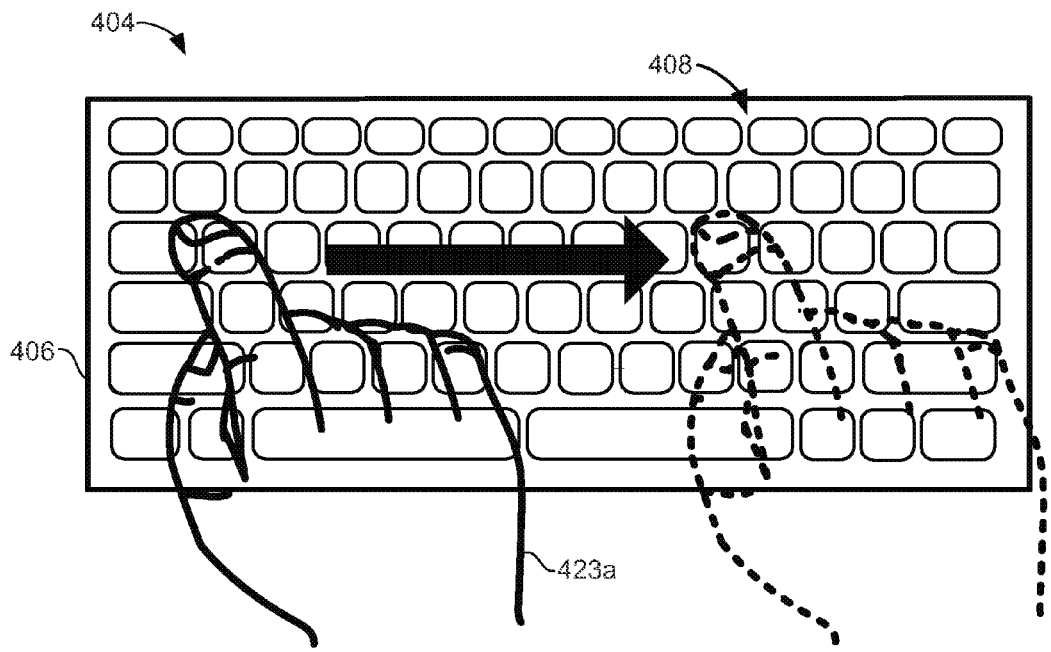

FIGS. 4A-4B are top-down views of the touch-enabled input device according to an example of the present invention. As shown in one example embodiment, the input device 404 resembles a standard keyboard layout having rows of keys 410 formed on a top surface 408. Each key of the digitized keyboard 410 includes a border region 416a-416d for example which allows the operating user to easily identify individual keys for customary text entry. In the present example, the operating user's hands 423a and 423b are in the traditional typing position for character entry operation. According to one example embodiment, depression of a single key area may signal to the processor that the user desires to operate in character input mode so as to cause individual keys of the digitized keyboard 410 to illuminate. Conversely, light input pressure without full key depression and/or an additional qualifying characteristic (e.g., within a short time period) may signal to the processor that the user desires to operate in a touchscreen-related/touch-based input mode for mouse-based and multi-touch operations.

As shown in the example of FIG. 4B, when in touchscreen-related or touch-based input mode the individual keys may be unilluminated or dimmed so as to provide the look of a blank touch surface 408. In this operating mode, gesture input from the user is interpreted by the processing unit to provide corresponding functionality. For example and as shown in FIG. 4B, left to right movement of the user's hand/finger 423a across the input surface 408 may cause the cursor shown on the display to move left to right as accomplished on a traditional touchscreen, trackpad or other mouse-related device. Similarly, multi-touch operations such as a pinch movement (e.g., closing index finger and thumb) or opposite movement (e.g., expanding index finger and thumb) may cause the display to zoom in or zoom out respectively when the device is in the touch input mode. As a result, the touch-based input device 404 of the present example is capable of providing multiple operating modes in an efficient and intuitive manner for the operating user.

Figure 5:
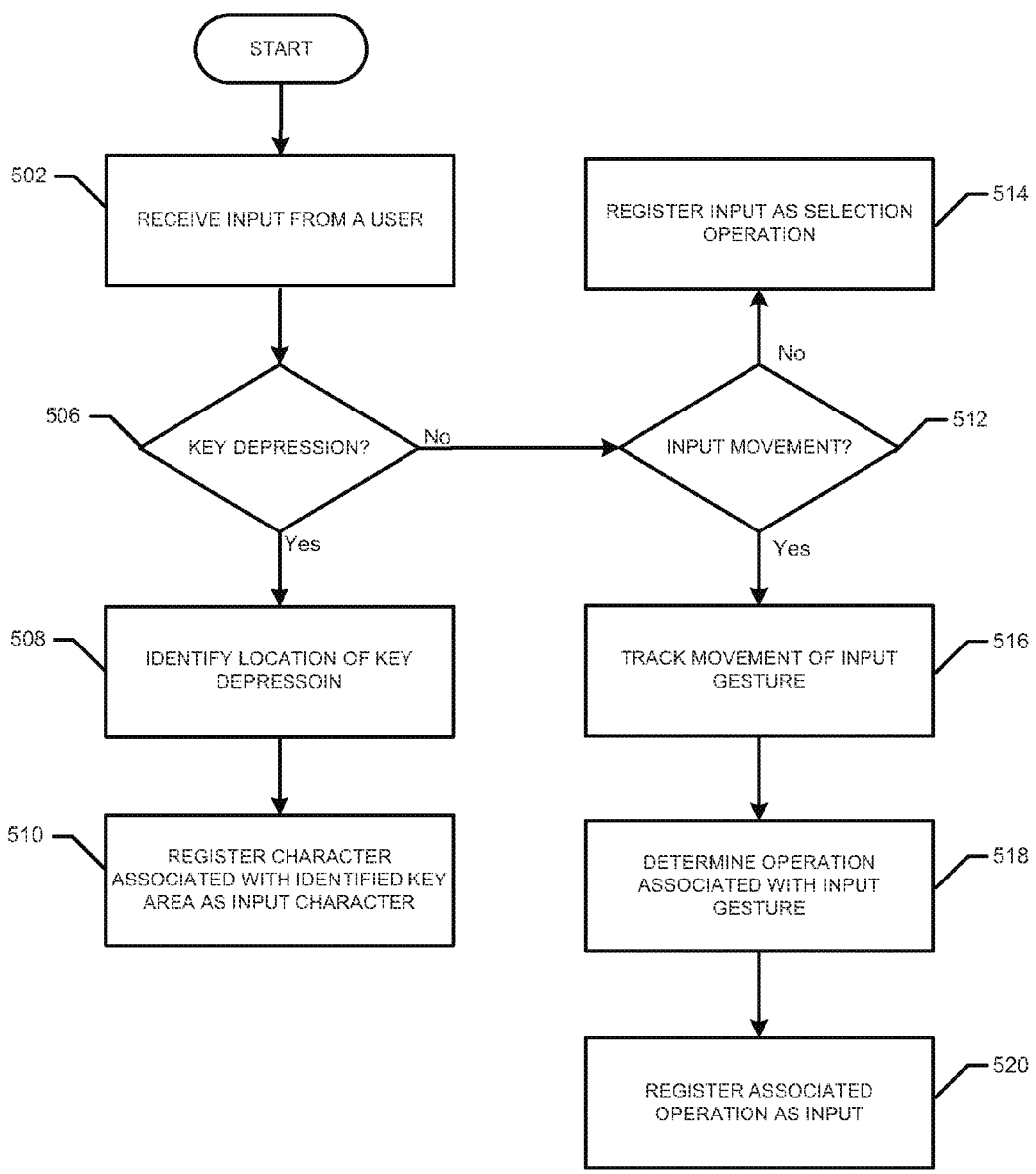
FIG. 5 is a simplified flow chart of the processing steps for the touch-enabled input device according to an example of the present invention.

FIG. 5 is a simplified flow chart of the processing steps for the touch-enabled input device according to an example of the present invention. In step 502, the processing unit receives input from an operating user. The initial form of input may be depression of any one of the identifiable key areas or slight pressure along the touch or input surface. In step 506, the processing unit determines if the key area has reached a pressure threshold value (i.e., electrical contact triggered by underside of key). Alternatively, pressure of the user input may be measured by the processing unit. Pressure information such as the strain/deflection associated with depression of each key area and the input surface may be measured via a piezoresistive strain gauge sensor (coupled to the each key area of the input surface) or similar pressure sensing means for example. If the pressure information reaches or exceeds the threshold value (e.g., electrical contact triggered, or gauge factor greater than 3 in the case of a pressure sensor), then the processing unit determines that the user desires character entry input and proceeds to identify the specific location of the key area in step 508. As mentioned above, the location of an individual key press on the digitized keyboard may be accomplished by measuring the change in capacitance caused by the conducting agent (e.g., user's finger) touching a particular location of the input surface.

Thereafter, in step 510, the character (e.g., letter "R") associated with the identified key area is registered as the input character by the processing unit. One the other hand, if the pressure information of the touch input is less than the threshold value (e.g., no electrical contact or gauge factor less than 3 in the case of a pressure sensor), the processing unit determines that the user intends for touchscreen-based input operation. As a result, the processing unit determines if movement is associated with the user input (e.g., move cursor, multi—touch) in step 512. If no movement is determined, then in step 514 the processing unit may register the input as a selection operation (e.g., mouse click). Otherwise, the processing unit monitors and tracks the movement of the input gesture in step 516. Next, the processing unit determines an operation associated with the input gesture in step 518. For example, a circular touch gesture along the input surface may be associated with an operation that moves the cursor in a corresponding circular direction, closing of the index finger and thumb along the surface may be associated a zoom-in operation, or expansion of the index finger and thumb may be associated with a zoom-out operation for example. These are just a few examples as numerous mouse-based and multi-touch operations may be utilized in accordance with examples of the present invention. Next, in step 520, the determined operation is registered as an input by the processing unit.

Embodiments of the present invention provide a multi-mode and touch-enabled input device. Many advantages are afforded by the touch-enabled input device of the present examples. For instance, the touch-enabled input device effectively combines keyboard and navigation functions in a simplified and robust keyboard-style design, thus streamlining and reducing manufacturing costs. Furthermore, examples of the present invention efficiently provide keyboard, mouse, and multi-touch functionality without any movement of the hands from their natural home position on the keyboard.

Furthermore, while the invention has been described with respect to exemplary embodiments, one skilled in the art will recognize that numerous modifications are possible. For example, although exemplary embodiments depict a tablet personal computer as the representative computing device, the invention is not limited thereto. For example, the computing device and display may be a notebook computer, an all-one-computer, a television monitor, a smartphone, or any other electronic device capable of accepting text and mouse-related input.

Furthermore, the input device may be of any size or shape other than that depicted in the corresponding figures. For example, the housing of the input device may be square, circular, or a non-linear ergonomically-shaped design. Similarly, the identifiable key areas may include alphanumeric characters, numerical-only characters, punctuation characters, or provide a means of alternating display between the like.

Thus, although the invention has been described with respect to exemplary embodiments, it will be appreciated that the invention is intended to cover all modifications and equivalents within the scope of the following claims.

What is claimed is:

1. A touch-enabled input device, the device comprising:
   a housing having an input surface;
   a plurality of identifiable key areas formed along the input surface, wherein the input surface is configured to detect individual presses of each of the key areas in addition to touch-based input from a user; and
   depression mechanisms associated with each of the key areas, wherein the depression mechanisms are configured for discriminating pressure information of received input received from a touch surface, wherein the discrimination is used to distinguish between a touch-based input operation and a character entry operation,
   wherein the device is configured to operate in a first input mode and a second input mode,
   wherein each of the plurality of identifiable key areas include a border region and one of the depression mechanisms, and wherein the border region of each key area is associated with a particular input character or touchscreen location, and
   wherein the depression mechanism and a threshold pressure value are used to determine if the received input is associated with the touch-based input operation or the character entry operation.

2. The device of claim 1, wherein the input surface includes sensors to form a touch capacitive surface.

3. The device of claim 1, wherein the device is switched from a first input mode to a second input mode via a dedicated activation key, key combination, or button.

4. The device of claim 1, wherein the input surface including the plurality of key areas is substantially flat.

5. The device of claim 1, wherein the input surface is configured to detect multi-touch gestures from a user.

6. A method for providing touch-enabled input for a computing system, the method comprising:
   receiving input from a user on a touch surface of an input device, wherein the touch surface includes a plurality of identifiable key areas; and
   discriminating pressure information of the received input, wherein the discrimination is used to distinguish between a touch-based operation and a character entry operation;
   identifying a key area of depression associated with the received input when the pressure information reaches or exceeds a threshold value; and
   determining whether the input received from the user is moving or stationary when the pressure information is less than the threshold value.

7. The method of claim 6, further comprising:
   registering a character associated with the identified key area as an input character.

8. The method of claim 6, further comprising:
   registering the input received from the user as a selection operation when the input is stationary.

9. The method of claim 6, further comprising:
   tracking gesture movement of the input when the input is determined to be moving.

10. The method of claim 9, further comprising:
    determining an operation associated with the tracked gesture movement; and
    registering the operation as an input for the computing system.

* * * * *

UNITED STATES PATENT AND TRADEMARK OFFICE
CERTIFICATE OF CORRECTION

PATENT NO. : 8,970,498 B2  
APPLICATION NO. : 13/097258  
DATED : March 3, 2015  
INVENTOR(S) : Bradley Neal Suggs Page 1 of 1

It is certified that error appears in the above-identified patent and that said Letters Patent is hereby corrected as shown below:

In the Drawings,

In sheet 5 of 5, reference numeral 508, line 2, delete "DEPRESSOIN" and insert -- DEPRESSION --, therefor.

Signed and Sealed this  
Seventh Day of July, 2015

Michelle K. Lee  
*Director of the United States Patent and Trademark Office*